(12) United States Patent
Iwamura et al.

(10) Patent No.: US 10,525,776 B2
(45) Date of Patent: Jan. 7, 2020

(54) AIRLESS TIRE

(71) Applicant: SUMITOMO RUBBER INDUSTRIES, LTD., Kobe-shi (JP)

(72) Inventors: Wako Iwamura, Kobe (JP); Makoto Sugiya, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 245 days.

(21) Appl. No.: 15/297,417

(22) Filed: Oct. 19, 2016

(65) Prior Publication Data
US 2017/0106699 A1    Apr. 20, 2017

(30) Foreign Application Priority Data
Oct. 19, 2015 (JP) ................. 2015-205492

(51) Int. Cl.

| | |
|---|---|
| *B60C 7/00* | (2006.01) |
| *B60C 11/12* | (2006.01) |
| *B60C 11/03* | (2006.01) |
| *B60C 7/06* | (2006.01) |
| *B60C 7/24* | (2006.01) |
| *B60C 7/10* | (2006.01) |
| *B60B 3/06* | (2006.01) |
| *B60B 3/10* | (2006.01) |
| *B60C 7/18* | (2006.01) |

(52) U.S. Cl.
CPC ............ *B60C 11/032* (2013.01); *B60C 7/06* (2013.01); *B60C 7/10* (2013.01); *B60C 7/24* (2013.01); *B60B 3/06* (2013.01); *B60B 3/10* (2013.01); *B60C 7/18* (2013.01); *B60C 2007/005* (2013.01); *B60C 2011/0346* (2013.01)

(58) Field of Classification Search
CPC .. B60C 7/00; B60C 7/22; B60C 11/00; B60C 11/12; B60C 11/1259
See application file for complete search history.

(56) References Cited

U.S. PATENT DOCUMENTS 867,756 A * 10/1907 Rock .................... B60C 7/12
152/324

FOREIGN PATENT DOCUMENTS

JP    2008-044445 A    2/2008

OTHER PUBLICATIONS

Machine translation of JP 2008-044445, 2008.*

* cited by examiner

*Primary Examiner* — Justin R Fischer
(74) *Attorney, Agent, or Firm* — Oblon, McClelland, Maier & Neustadt, L.L.P.

(57) ABSTRACT

An airless tire includes a tread ring having a cylindrical form and a ground contact surface. The tread ring has multiple through holes and a reinforcing body such that the through holes are penetrating through the tread ring in a thickness direction of the tread ring and formed at intervals along a tire circumferential direction and that the reinforcing body includes a first reinforcing body extending in the tire circumferential direction in regions between adjacent through holes, and the first reinforcing body is formed such that the first reinforcing body has end portions in the tire circumferential direction and that the end portions terminate without being exposed from inner peripheral surfaces of the through holes.

20 Claims, 7 Drawing Sheets

AIRLESS TIRE

CROSS-REFERENCE TO RELATED APPLICATIONS

The present application is based upon and claims the benefit of priority to Japanese Patent Application No. 2015-205492, filed Oct. 19, 2015, the entire contents of which are incorporated herein by reference.

BACKGROUND OF THE INVENTION

Field of the Invention

The present invention relates to an airless tire that allows both good drainage performance and good durability to be achieved and allows uneven wear resistance to be improved.

Description of Background Art

In recent years, various airless tires have been proposed. An airless tire, without using high pressure air, can support a load by a structural member of its own. Therefore, the airless tire has an advantage that it does not go flat.

For example, Japanese Patent Laid-Open Publication No. 2008-044445 describes an airless tire that includes a cylindrical tread ring. Multiple through holes and a reinforcing body are provided in the tread ring, the multiple through holes penetrating through the tread ring in a thickness direction of the tread ring. The entire contents of this publication are incorporated herein by reference.

SUMMARY OF THE INVENTION

According to one aspect of the present invention, an airless tire includes a tread ring having a cylindrical form and a ground contact surface. The tread ring has multiple through holes and a reinforcing body such that the through holes are penetrating through the tread ring in a thickness direction of the tread ring and formed at intervals along a tire circumferential direction and that the reinforcing body includes a first reinforcing body extending in the tire circumferential direction in regions between adjacent through holes, and the first reinforcing body is formed such that the first reinforcing body has end portions in the tire circumferential direction and that the end portions terminate without being exposed from inner peripheral surfaces of the through holes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
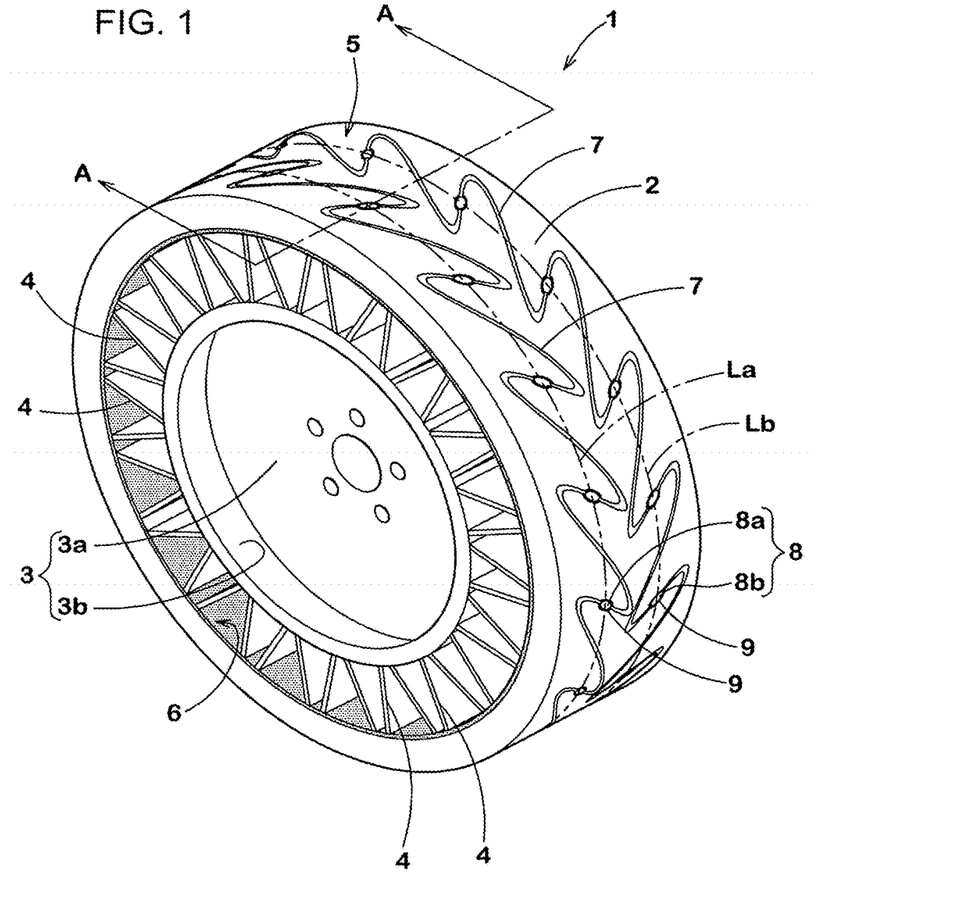
FIG. 1 is an overall perspective view illustrating an airless tire according to an embodiment of the present invention.

As illustrated in FIG. 1, an airless tire 1 of the present embodiment includes a cylindrical tread ring 2, a hub part 3 that is positioned on a tire radial direction inner side of the tread ring 2, and multiple spokes 4 that connect the tread ring 2 and the hub part 3.

The hub part 3 includes a disc part ($3a$) that is fixed to an axle, and a cylindrical part ($3b$) that is formed on an outer periphery of the disc part ($3a$) and extends in a circumferential direction. Similar to a conventional tire wheel, the hub part 3 can be formed, for example, of a metal material such as steel, aluminum alloy or magnesium alloy.

The spokes 4 each have a plate-like shape. The multiple spokes 4 are provided along the tire circumferential direction. Although not particularly limited, the spokes 4 are formed by a cast-molded body of a polymer material such as polyurethane. For example, the tread ring 2 and the hub part 3 are positioned in advance in a mold, and the polymer material is filled in the mold so as to connect the tread ring 2 and the hub part 3. By curing the polymer material, the spokes 4 that connect the tread ring 2 and the hub part 3 are formed. Regarding the shape of the spokes 4, various embodiments can be adopted in addition to that illustrated in the drawings.

The tread ring 2 of the present embodiment has a ground contact surface 5 that is in contact with a road surface, and has an inward surface 6 that is on an opposite side of the ground contact surface 5 and faces the hub part 3 side. As a preferred embodiment, at least one groove is provided in the ground contact surface 5. In the present embodiment, two grooves 7 are provided in the ground contact surface 5. When running on a wet road surface, such grooves 7 allow water on the road surface to be removed and thus allow drainage performance of the airless tire 1 to be improved.

Multiple through holes 8 that penetrate through the tread ring 2 from the ground contact surface 5 to the inward surface 6 in a thickness direction of the tread ring 2 are provided in the tread ring 2. A cross-sectional shape of each of the through holes 8 can be selected from arbitrary shapes including, for example, a circular shape, an elliptical shape, a polygonal shape and the like. When running on a wet road surface, the through holes 8 allow water on the road surface to be efficiently removed and thus allow the drainage performance of the airless tire 1 to be further improved.

The through holes 8 of the present embodiment, for example, are provided on the grooves 7. It is desirable that portions of the grooves 7 where the through holes 8 are respectively provided be locally enlarged portions as widened portions 9 that have a larger groove width than other portions. When running on a wet road surface, the widened portions 9 allow water on the road surface to be removed and thus allow the drainage performance of the airless tire 1 to be further improved.

The multiple through holes 8 of the present embodiment include multiple first through holes ($8a$) that are formed on a first tire circumferential direction line (La) and multiple second through holes ($8b$) that are formed on a second tire circumferential direction line (Lb). It is desirable that the multiple through holes 8 including multiple first through holes (8a) and the multiple second through holes (8b) be respectively formed at intervals in the tire circumferential direction.

Figure 2:
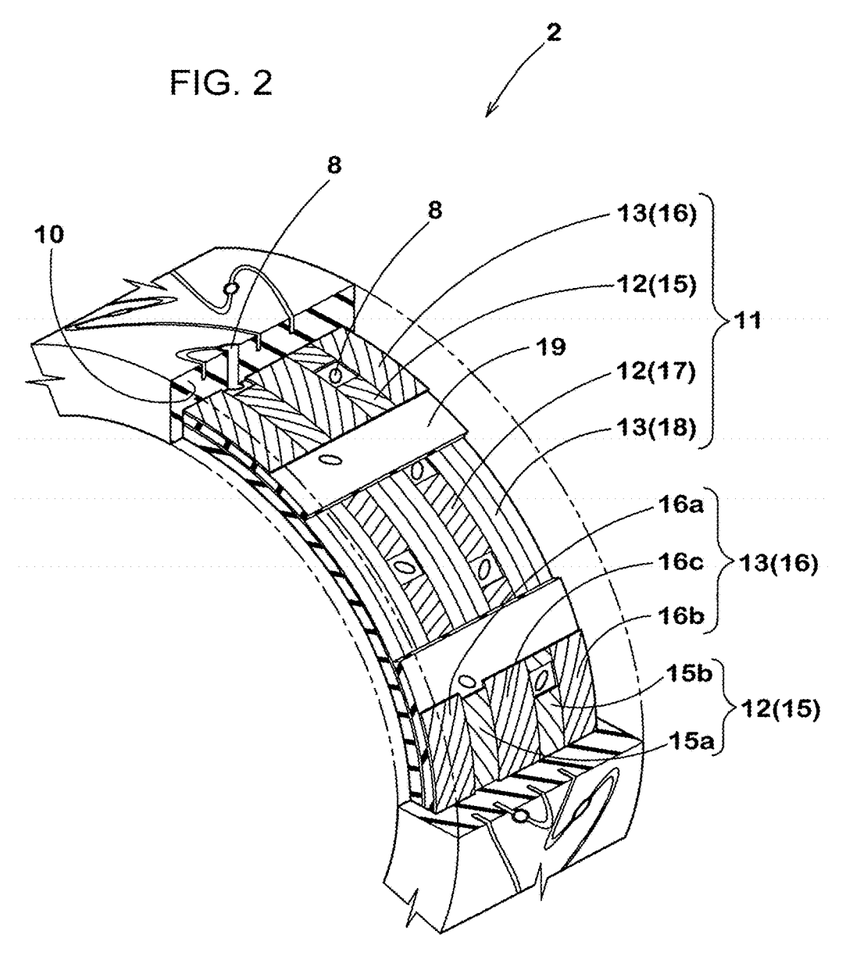
FIG. 2 is a perspective view (partially cut-away view) of a tread ring of FIG. 1.

FIG. 2 illustrates a perspective view (partially cut-away view) of the tread ring 2 alone. As illustrated in FIG. 2, the tread ring 2 of the present embodiment includes a tread rubber part 10 that forms the ground contact surface 5 and the inward surface 6. Since the tread rubber part 10 forms the ground contact surface 5, a sulfur vulcanized rubber composition that is excellent in frictional force and wear resistance against the road surface can be preferably adopted.

A reinforcing body 11 that is formed inside the tread rubber part 10 is provided in the tread ring 2 of the present embodiment. The reinforcing body 11 includes, for example, a first reinforcing body 12 that discontinuously extends in the tire circumferential direction in regions between through holes 8 that adjacent to each other in the tire circumferential direction, and an annular second reinforcing body 13 that continuously extends in the tire circumferential direction in a region where the through holes 8 are not formed. Such a reinforcing body 11 allows the rigidity of the tread ring 2 to be improved, and as a result, allows steering stability of the airless tire 1 to be improved.

Figure 3:
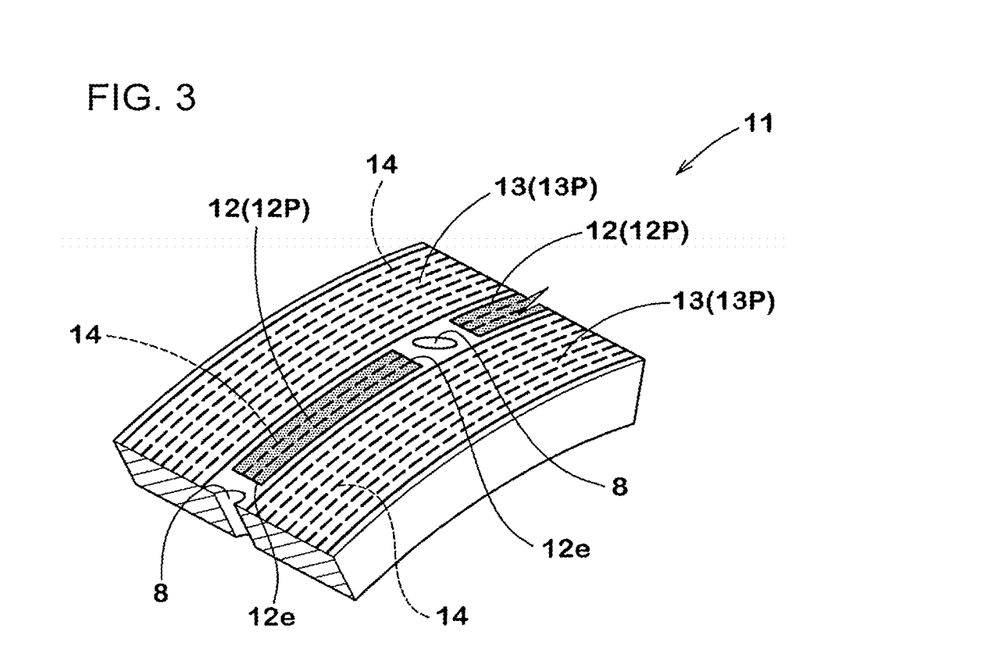
FIG. 3 is a partial perspective view of a reinforcing body of FIG. 2.

FIG. 3 illustrates a partial perspective view of the reinforcing body 11. As illustrated in FIG. 3, it is desirable that the second reinforcing body 13 be a ply (13P) that includes multiple reinforcing cords 14. As the reinforcing cords 14, for example, steel cords are preferably adopted. The ply (13P) of the second reinforcing body 13, for example, is a jointless ply that is formed by spirally winding the reinforcing cords 14 at an angle of 5 degrees or less with respect to the tire circumferential direction. Such a second reinforcing body 13 allows both reduction in weigh and enhancement in strength to be achieved.

It is desirable that the first reinforcing body 12 be a ply (12P) that includes multiple reinforcing cords 14. The ply (12P) of the first reinforcing body 12, for example, is a ply that is formed of the same material as the ply (13P) of the second reinforcing body 13, and is a jointless ply that is formed by winding the reinforcing cords 14 at an angle of 5 degrees or less with respect to the tire circumferential direction. Such a first reinforcing body 12 has rigidity that is substantially equal to that of the second reinforcing body 13 and allows rigidity of the tread ring 2 in the tire width direction to be substantially uniform. Therefore, uneven wear resistance of the airless tire 1 can be improved.

Both ends (12e) of the first reinforcing body 12 in the tire circumferential direction terminate without being exposed from inner peripheral surfaces of the through holes 8. For example, the rubber composition of the tread rubber part 10 (illustrated in FIG. 2) during vulcanization flows into between the ends (12e) of the first reinforcing body 12 and the inner peripheral surfaces of the through holes 8 and prevents the ends (12e) of the first reinforcing body 12 from being exposed from the inner peripheral surfaces of the through holes 8. The ends (12e) of the first reinforcing body 12 are not exposed from the inner peripheral surface of the through holes 8, and thus do not come into contact with water penetrating from the through holes 8. Therefore, even when the reinforcing cords 14 of the first reinforcing body 12 are steel cords, the first reinforcing body 12 is not corroded at an early stage and thus the durability of the airless tire 1 can be improved.

As illustrated in FIG. 2, the first reinforcing body 12 includes, for example, an outer-side first reinforcing body 15, and an inner-side first reinforcing body 17 that is formed on a tire radial direction inner side of the outer-side first reinforcing body 15. Similarly, the second reinforcing body 13 also includes, for example, an outer-side second reinforcing body 16, and an inner-side second reinforcing body 18 that formed on a tire radial direction inner side of the outer-side second reinforcing body 16.

It is desirable that a shear layer 19 formed of elastomer be formed between the outer-side first reinforcing body 15 and second reinforcing body 16 and the inner-side first reinforcing body 17 and second reinforcing body 18. In the present specification, the term "elastomer" is a general term for all polymeric materials that exhibit rubber elasticity at normal temperatures, and is a concept that includes vulcanized rubber and resin as typical examples. Such a shear layer 19 allows rolling resistance to be reduced while allowing steering stability of the airless tire 1 to be maintained.

Figure 4:
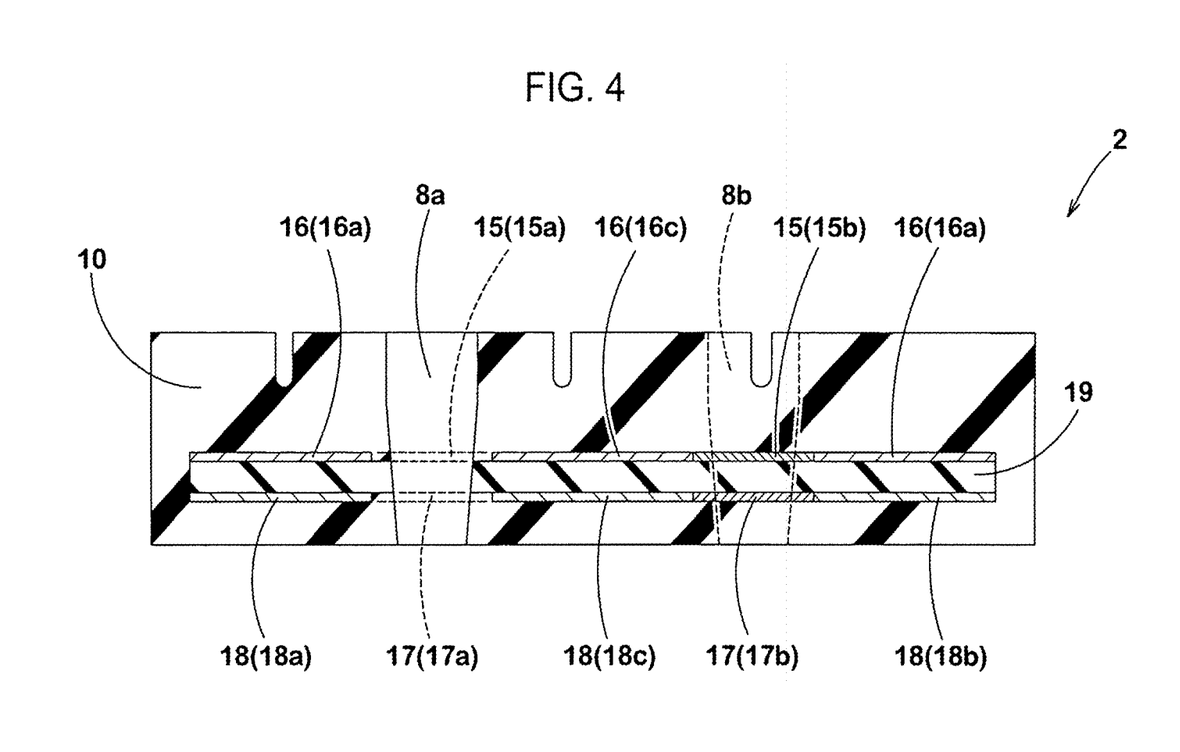
FIG. 4 is a cross-sectional view along an A-A line of the tread ring of FIG. 1.

FIG. 4 illustrates a cross-sectional view along an A-A in FIG. 1. As illustrated in FIG. 4, it is desirable that, in a transverse cross section of the tread ring 2, the outer-side first reinforcing body 15 be positioned at the same position in the tire radial direction as the outer-side second reinforcing body 16. Further, it is desirable that the inner-side first reinforcing body 17 be positioned at the same position in the tire radial direction as the inner-side second reinforcing body 18. Such first reinforcing bodies (15, 17) and second reinforcing bodies (16, 18) allow the tread ring 2 to easily have substantially uniform rigidity in the tire width direction, and thus allow uneven wear resistance of the airless tire 1 to be improved.

As illustrated in FIGS. 2 and 4, the outer-side first reinforcing body 15 of the present embodiment includes a first outer-side first reinforcing body (15a) that is formed along the first tire circumferential direction line (La) (illustrated in FIG. 1) and a second outer-side first reinforcing body (15b) that is formed the second tire circumferential direction line (Lb) (illustrated in FIG. 1). Similarly, the inner-side first reinforcing body 17 of the present embodiment includes a first inner-side first reinforcing body (17a) that is formed along the first tire circumferential direction line (La) and a second inner-side first reinforcing body (17b) that is formed along the second tire circumferential direction line (Lb).

The outer-side second reinforcing body 16 of the present embodiment includes a first outer-side second reinforcing body (16a) that is formed on a tire width direction outer side of the first outer-side first reinforcing body (15a) and a second outer-side second reinforcing body (16b) that is formed on a tire width direction outer side of the second outer-side first reinforcing body (15b). The outer-side second reinforcing body 16 further includes a third outer-side second reinforcing body (16c) that is formed between the first outer-side first reinforcing body (15a) and the second outer-side first reinforcing body (15b).

Similarly, the inner-side second reinforcing body 18 of the present embodiment includes a first inner-side second reinforcing body (18a) that is formed on a tire width direction outer side of the first inner-side first reinforcing body (17a) and a second inner-side second reinforcing body (18b) that is formed on a tire width direction outer side of the second inner-side first reinforcing body (17b). The inner-side second reinforcing body 18 further includes a third inner-side second reinforcing body (18c) that is formed between the first inner-side first reinforcing body (17a) and the second inner-side first reinforcing body (17b).

It is desirable that the above-described first reinforcing bodies (15a, 15b, 17a, 17b) and second reinforcing bodies (16a, 16b, 16c, 18a, 18b, 18c) be respectively formed using separate plies and be positioned inside the tread rubber part 10. Since the plies are separated formed in such a reinforcing body 11, even when some of the plies are damaged, other plies are not affected by the damage.

In the above, an embodiment of the present invention is described in detail. However, the present invention is not limited to the above-described embodiment and can be embodied in various modified forms.

For example, the through holes 8 of the above-described embodiment penetrate through the tread ring 2 along the tire radial direction. However, without being limited to this embodiment, it is sufficient that the through holes 8 penetrate through the tread ring 2 from the ground contact surface 5 to the inward surface 6 in a thickness direction of the tread ring 2. Therefore, the through holes 8, for example, may be inclined with respect to the tire radial direction, and further may be bent or curved in the tread ring 2.

Further, in the above-described embodiment, the ply (12P) of the first reinforcing body 12 and the ply (13P) of the second reinforcing body 13 are formed as separate plies. However, for example, the ply (12P) and the ply (13P) may also be formed as a single ply. In this case, it is desirable that large-diameter holes that are concentric to the through holes 8 and have a diameter larger than a maximum diameter of the through holes 8 are provided in the single ply. Even for the reinforcing body 11 that includes such a single ply, since end surfaces of the large-diameter holes are not exposed from the inner peripheral surfaces of the through holes 8, the reinforcing body 11 is not corroded at an early stage and thus the durability of the airless tire 1 can be improved.

Figure 5:
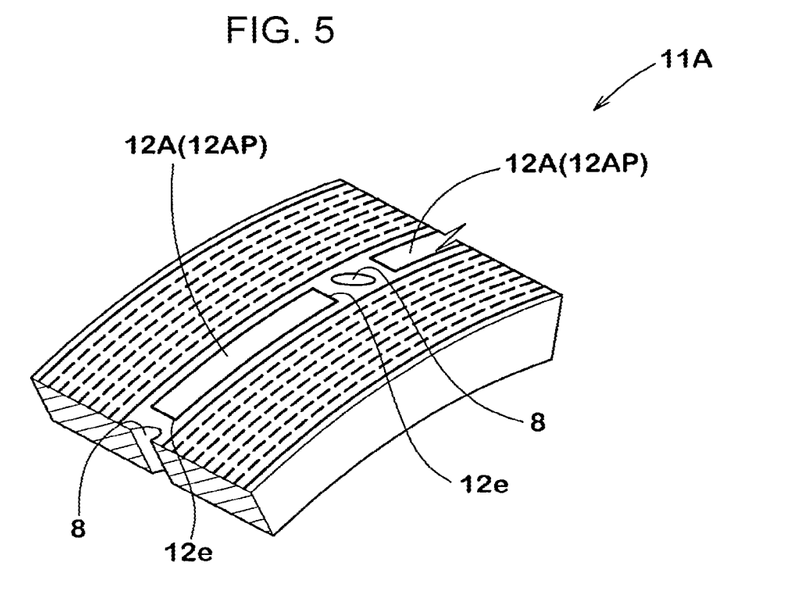
FIG. 5 is a partial perspective view of a reinforcing body of another embodiment.

FIG. 5 illustrates a partial perspective view of a reinforcing body (11A) of another embodiment. As illustrated in FIG. 5, a first reinforcing body (12A) of the reinforcing body (11A) of the present embodiment includes a metal plate (12AP). By adjusting a plate thickness of such a metal plate (12AP), the rigidity of the first reinforcing body (12A) can be adjusted. Therefore, the metal plate (12AP) allows the reinforcing body (11A) to easily have substantially uniform rigidity in the tire width direction, and thus allows uneven wear resistance of the airless tire that includes the reinforcing body (11A) to be improved.

Even for such a first reinforcing body (12A), both ends (12e) in the tire circumferential direction terminate without being exposed from the inner peripheral surfaces of the through holes 8. Therefore, the first reinforcing body (12A) is prevented from being corroded at an early stage.

Figure 6:
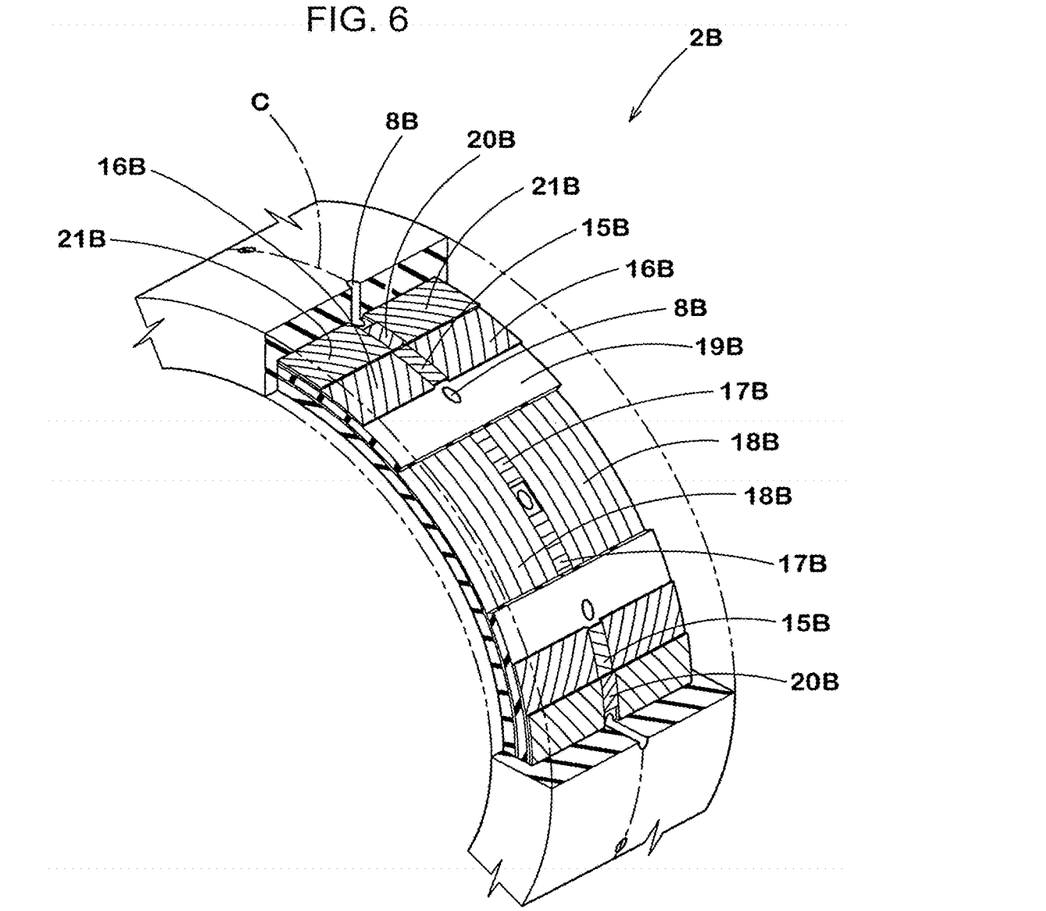
FIG. 6 is a perspective view (partially cut-away view) of a tread ring of yet another embodiment.

FIG. 6 illustrates a perspective view (partially cut-away view) of a tread ring (2B) of yet another embodiment. As illustrated in FIG. 6, in the tread ring (2B) of the present embodiment, multiple through holes (8b) are formed on the tire equator (C). In the tread ring (2B), for example, a groove is not provided on a ground contact surface (5B). In this way, depending on a size and positions of the through holes (8b) and further depending on an intended use of an airless tire that includes the tread ring (2B), whether or not to provide a groove in the tread ring (2B) can be selected.

In the tread ring (2B) of the present embodiment, an outermost-side first reinforcing body (20B) is formed on a tire radial direction outer side of the outer-side first reinforcing body (15b). Similarly, in the tread ring (2B), an outermost-side second reinforcing body (21B) is formed on a tire radial direction outer side of the outer-side second reinforcing body (16b). In this way, a reinforcing body on a tire radial direction outer side of a shear layer (19B) has a two-layer structure, and thereby, rigidity of the tread ring (2B) can be further improved.

The first reinforcing bodies (15b, 20B) and the second reinforcing bodies (16b, 21B), for example, are each a ply that includes multiple reinforcing cords. It is desirable that the reinforcing cords of the outer-side first reinforcing body (15b) and the reinforcing cords of the outermost-side first reinforcing body (20B) be formed at the same inclination angle (for example, 15-65 degrees) with respect to the tire circumferential direction but in mutually opposite inclination directions. Similarly, it is desirable that the reinforcing cords of the outer-side second reinforcing body (16b) and the reinforcing cords of the outermost-side second reinforcing body (21B) be formed at the same inclination angle (for example, 15-65 degrees) with respect to the tire circumferential direction but in mutually opposite inclination directions.

Such first reinforcing bodies (15b, 20B) and second reinforcing bodies (16b, 21B) can enhance tire circumferential direction rigidity, tire axial direction rigidity and torsional rigidity of the tread ring (2B) in a well-balanced manner, and thus can effectively reinforce the tread ring (2B).

In the tread ring (2B) of the present embodiment, an inner-side first reinforcing body (17b) and an inner-side second reinforcing body (18b) are further formed on a tire radial direction inner side of the shear layer (19B). It is desirable that the inner-side first reinforcing body (17b) and the inner-side second reinforcing body (18b) also be each a ply that includes multiple reinforcing cords. It is preferable that the plies of the inner-side first reinforcing body (17b) and the inner-side second reinforcing body (18b) be each a jointless ply that is formed by spirally winding the reinforcing cords at an angle of 5 degrees or less with respect to the tire circumferential direction.

Figure 7:
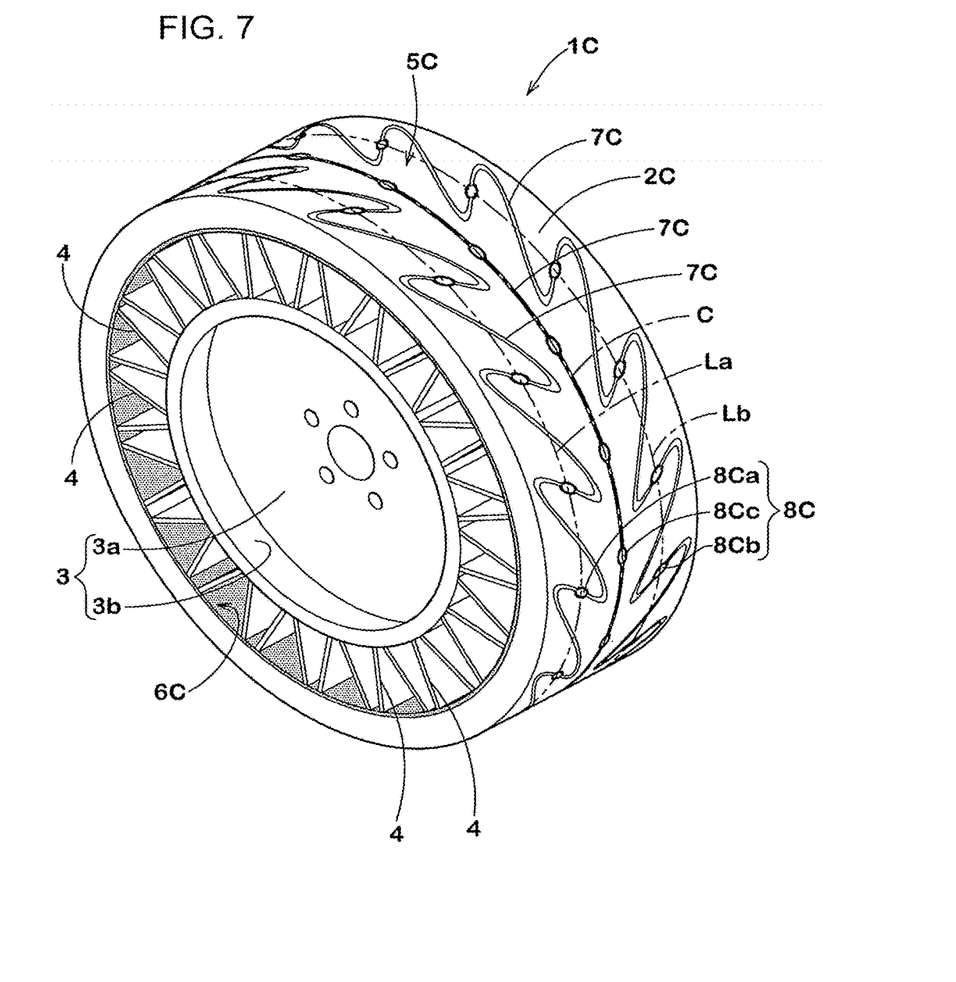
FIG. 7 is an overall perspective view of an airless tire of yet another embodiment.

FIG. 7 illustrates an overall perspective view of an airless tire (1C) of yet another embodiment. As illustrated in FIG. 7, the airless tire (1C) of the present embodiment includes the hub part 3 and the multiple spokes 4 that are common to the above-described airless tire 1, the hub part 3 including the disc part (3a) and the cylindrical part (3b). The airless tire (1C) further includes a tread ring (2C) that has a ground contact surface (5C) and an inward surface (6C).

Three grooves (7C) and multiple through holes (8C) are provided in the ground contact surface (5C) of the tread ring (2C). The multiple through holes (8C) of the present embodiment include multiple first through holes (8Ca) that are formed on the first tire circumferential direction line (La), multiple second through holes (8Cb) that are formed on the second tire circumferential direction line (Lb), and multiple third through holes (8Cc) that are formed on the tire equator (C).

Although not illustrated in the drawings, also in the present embodiment, a first reinforcing body is provided in the tread ring (2C), the first reinforcing body extending along the tire circumferential direction in regions between adjacent first through holes (8Ca), between adjacent second through holes (8Cb) and between adjacent third through holes (8Cc). Both ends of the first reinforcing body also terminate, of course, without being exposed from inner peripheral surfaces of the through holes (8Ca, 8Cb, 8Cc).

EXAMPLES

Airless tires (tires corresponding to a tire size of 125/80R13) that each form the basic structure of FIG. 1-4 are prototyped based on specifications of Table 1, and drainage performance, durability and uneven wear resistance are tested. The spokes are integrally molded with the tread ring and the hub part using cast molding method using a urethane resin (thermosetting resin). A test method is as follows.

Drainage Performance

Each of the prototyped tires is mounted to a compact passenger car, which is run by a test driver on a test course of a paved road surface in a wet state. Running characteristics related to drainage performance in this case are evaluated based on a sensory evaluation by the test driver. The result is an index number with a result of Comparative Example 1 as 100. A larger index number indicates a better drainage performance.

Durability

A drum testing machine is used. Durability test for each of the prototyped tires in a humid and hot condition is performed under the following conditions. After the test, each of the prototyped tires is cut, and whether or not rust has occurred in the ply of the first reinforcing body is confirmed by visual inspection. The result is expressed as "Yes" indicating that rust is occurred or "No" indicating that rust is not occurred. That rust is not occurred indicates that corrosion is not occurred to the first reinforcing body and the durability is excellent.

Load: 1.5 kN
Speed: 60 km/h

Uneven Wear Resistance

An uneven wear testing machine is used. Each of the prototyped tires is run under the following conditions, and an average of uneven wear amounts under the running conditions is calculated. The result is an index number with a result of Comparative Example 1 as 100. A larger index number indicates a better uneven wear resistance.

Load: 1.5 kN
Running Condition: Braking Condition, Driving Condition, Free-Rolling Condition, Turning Condition The test results are illustrated in Table 1.

body that extend in regions between through holes and allows both good drainage performance and good durability to be achieved and allows uneven wear resistance to be improved.

An airless tire according to an embodiment of the present invention includes a cylindrical tread ring that has a ground contact surface. Multiple through holes and a reinforcing body are provided in the tread ring, the multiple through holes penetrating through the tread ring in a thickness direction of the tread ring. The multiple through holes are formed at intervals along a tire circumferential direction. The reinforcing body includes a first reinforcing body that extends in the tire circumferential direction in regions between adjacent through holes. Both ends of the first reinforcing body in the tire circumferential direction terminate without being exposed from inner peripheral surfaces of the through holes.

It is desirable that, in the airless tire according to an embodiment of the present invention, the reinforcing body further include an annular second reinforcing body that continuously extends in the tire circumferential direction, and the second reinforcing body extend in a region where the through holes are not formed.

It is desirable that, in the airless tire according to an embodiment of the present invention, the second reinforcing body be a ply that includes multiple reinforcing cords.

It is desirable that, in the airless tire according to an embodiment of the present invention, the ply of the second reinforcing body be a jointless ply that is formed by spirally winding the reinforcing cords at an angle of 5 degrees or less with respect to the tire circumferential direction.

It is desirable that, in the airless tire according to an embodiment of the present invention, in a transverse cross section of the tread ring, the first reinforcing body be positioned at the same position in the tire radial direction as the second reinforcing body.

TABLE 1

|  | Comparative example 1 | Comparative example 2 | Comparative example 3 | Example 1 | Example 2 | Example 3 | Example 4 |
| --- | --- | --- | --- | --- | --- | --- | --- |
| Through holes in tread ring | No | Yes | Yes | Yes | Yes | Yes | Yes |
| Groove on ground contact surface | Yes | Yes | Yes | Yes | Yes | Yes | No |
| First reinforcing body | No | No | Yes | Yes | Yes | Yes | Yes |
| Exposure of first reinforcing body in through holes | — | — | Yes | No | No | No | No |
| Material of first reinforcing body | — | — | Ply | Ply | Ply | Metal plate | Ply |
| Diameter difference between first reinforcing body and second reinforcing body (mm) | — | — | 0 | 0 | 3 | 0 | 0 |
| Drainage performance (index number) | 100 | 130 | 130 | 130 | 130 | 130 | 110 |
| Durability (rust occurred to first reinforcing body) | — | — | Yes | No | No | No | No |
| Uneven wear resistance (index number) | 100 | 70 | 100 | 100 | 80 | 100 | 100 |

As is apparent from Table 1, it can be confirmed that the airless tires of the examples allow drainage performance, durability and uneven wear resistance to be improved in a well-balanced manner as compared to the comparative examples.

To prevent a reinforcing body from being corroded by water penetrating from through holes, an annular reinforcing body may be formed so as to be spaced apart from the through holes in a tire width direction. The tread ring does not have uniform rigidity in the tire width direction, and such non-uniform rigidity causes uneven wear to occur.

An airless tire according to an embodiment of the present invention includes multiple portions of a first reinforcing It is desirable that, in the airless tire according to an embodiment of the present invention, the first reinforcing body be a ply of the same material as the ply of the second reinforcing body.

It is desirable that, in the airless tire according to an embodiment of the present invention, the first reinforcing body be a ply that includes multiple reinforcing cords.

It is desirable that, in the airless tire according to an embodiment of the present invention, the first reinforcing body be a ply that includes a metal plate.

It is desirable that, in the airless tire according to an embodiment of the present invention, the multiple through holes be provided on a tire equator.

It is desirable that, in the airless tire according to an embodiment of the present invention, the multiple through holes include multiple first through holes that are formed on a first tire circumferential direction line and multiple second through holes that are formed on a second tire circumferential direction line.

It is desirable that, in the airless tire according to an embodiment of the present invention, the first reinforcing body include an outer-side first reinforcing body and an inner-side first reinforcing body that is formed on a tire radial direction inner side of the outer-side first reinforcing body, and a shear layer formed of elastomer be formed between the outer-side first reinforcing body and the inner-side first reinforcing body.

In an airless tire according to an embodiment of the present invention, the multiple through holes and the reinforcing body are provided in the tread ring, the multiple through holes penetrating through the tread ring in the thickness direction of the tread ring. Such through holes allow drainage performance of the airless tire to be improved. Further, the reinforcing body allows rigidity of the tread ring to be improved, and as a result, allows steering stability of the airless tire to be improved.

In an embodiment of the present invention, the reinforcing body includes multiple first reinforcing bodies that extend in the tire circumferential direction in regions between adjacent through holes. Such first reinforcing bodies can effectively reinforce regions between the through holes where rigidity is decreased due to the through holes. Further, by adjusting rigidity of the first reinforcing bodies, the first reinforcing bodies allow the rigidity of the tread ring in the tire width direction to be substantially uniform and thus allow uneven wear resistance of the airless tire to be improved.

Further, in an embodiment of the present invention, both ends of each of the first reinforcing bodies in the tire circumferential direction terminate without being exposed from the inner peripheral surfaces of the through holes. Such first reinforcing bodies do not come into contact with water penetrating from the through holes. Therefore, the first reinforcing bodies are not corroded at an early stage and thus allow durability of the airless tire to be improved.

Obviously, numerous modifications and variations of the present invention are possible in light of the above teachings. It is therefore to be understood that within the scope of the appended claims, the invention may be practiced otherwise than as specifically described herein.

The invention claimed is:

1. An airless tire, comprising:
a tread ring having a cylindrical form and a ground contact surface,
wherein the tread ring has a plurality of through holes and a reinforcing body such that the plurality of through holes is penetrating through the tread ring in a thickness direction of the tread ring and formed at intervals along a tire circumferential direction and that the reinforcing body comprises a first reinforcing body discontinuously extending in the tire circumferential direction in regions between the through holes adjacent in the tire circumferential direction, the first reinforcing body is formed such that the first reinforcing body has end portions formed between the through holes adjacent in the tire circumferential direction and that the end portions terminate without being exposed from inner peripheral surfaces of the through holes, and the reinforcing body comprises a second reinforcing body having an annular form and continuously extending in the tire circumferential direction such that the second reinforcing body is extending in a region where the through holes are not formed.

2. The airless tire according to claim 1, wherein the second reinforcing body comprises a ply comprising a plurality of reinforcing cords.

3. The airless tire according to claim 2, wherein the ply of the second reinforcing body is a jointless ply comprising the reinforcing cords spirally wound at an angle of 5 degrees or less with respect to the tire circumferential direction.

4. The airless tire according to claim 3, wherein the first reinforcing body and the second reinforcing body are positioned at a same position in a tire radial direction in a transverse cross section of the tread ring.

5. The airless tire according to claim 3, wherein the first reinforcing body comprises a ply, and the plies of the first and second reinforcing bodies comprise a same material.

6. The airless tire according to claim 2, wherein the first reinforcing body and the second reinforcing body are positioned at a same position in the tire radial direction in a transverse cross section of the tread ring.

7. The airless tire according to claim 2, wherein the first reinforcing body comprises a ply, and the plies of the first and second reinforcing bodies comprise a same material.

8. The airless tire according to claim 1, wherein the first reinforcing body and the second reinforcing body are positioned at a same position in a tire radial direction in a transverse cross section of the tread ring.

9. The airless tire according to claim 1, wherein the first reinforcing body comprises a ply, the second reinforcing body comprises a ply, and the plies of the first and second reinforcing bodies comprise a same material.

10. The airless tire according to claim 1, wherein the first reinforcing body comprises a ply comprising a plurality of reinforcing cords.

11. The airless tire according to claim 1, wherein the first reinforcing body comprises a metal plate.

12. The airless tire according to claim 1, wherein the tread ring has the plurality of through holes formed such that the plurality of through holes is positioned on a tire equator.

13. The airless tire according to claim 1, wherein the plurality of through holes includes a plurality of first through holes formed on a first tire circumferential direction line and a plurality of second through holes formed on a second tire circumferential direction line.

14. The airless tire according to claim 1, wherein the first reinforcing body comprises an outer-side first reinforcing body and an inner-side first reinforcing body positioned on a tire radial direction inner side of the outer-side first reinforcing body, and the tread ring comprises a shear layer comprising elastomer and formed between the outer-side first reinforcing body and the inner-side first reinforcing body.

15. An airless tire, comprising:
a tread ring having a cylindrical form and a ground contact surface,
wherein the tread ring has a plurality of through holes and a reinforcing body such that the plurality of through holes is penetrating through the tread ring in a thickness direction of the tread ring and formed at intervals along a tire circumferential direction and that the reinforcing body comprises a first reinforcing body extending in the tire circumferential direction in regions between adjacent through holes, the first reinforcing body is formed such that the first reinforcing body has end portions in the tire circumferential direction and that the end portions terminate without being exposed from inner peripheral surfaces of the through holes, the first reinforcing body comprises an outer-side first reinforcing body and an inner-side first reinforcing body positioned on a tire radial direction inner side of the outer-side first reinforcing body, and the tread ring comprises a shear layer comprising elastomer and formed between the outer-side first reinforcing body and the inner-side first reinforcing body.

16. The airless tire according to claim 15, wherein the first reinforcing body comprises a ply comprising a plurality of reinforcing cords.

17. The airless tire according to claim 15, wherein the first reinforcing body comprises a metal plate.

18. The airless tire according to claim 15, wherein the tread ring has the plurality of through holes formed such that the plurality of through holes is positioned on a tire equator.

19. The airless tire according to claim 15, wherein the plurality of through holes includes a plurality of first through holes formed on a first tire circumferential direction line and a plurality of second through holes formed on a second tire circumferential direction line.

20. The airless tire according to claim 15, wherein the reinforcing body comprises a second reinforcing body having an annular form and continuously extending in the tire circumferential direction such that the second reinforcing body is extending in a region where the through holes are not formed, and the second reinforcing body comprises a ply comprising a plurality of reinforcing cords.

* * * * *